US006940485B2

(12) United States Patent  
Noolandi

(10) Patent No.: US 6,940,485 B2  
(45) Date of Patent: Sep. 6, 2005

(54) FLEXIBLE MICRON-THIN DISPLAY DEVICE

(75) Inventor: Jaan Noolandi, Mississauga (CA)

(73) Assignee: Xerox Corporation, Stamford, CT (US)

( * ) Notice: Subject to any disclaimer, the term of this patent is extended or adjusted under 35 U.S.C. 154(b) by 427 days.

(21) Appl. No.: 10/342,544

(22) Filed: Jan. 15, 2003

(65) Prior Publication Data

US 2004/0135745 A1 Jul. 15, 2004

(51) Int. Cl.[7] .................................................. G09G 3/34
(52) U.S. Cl. ..................................... 345/107; 359/296
(58) Field of Search ............................... 345/107, 105; 359/296

(56) References Cited

U.S. PATENT DOCUMENTS 6,538,801 B2 * 3/2003 Jacobson et al. ........... 359/296

FOREIGN PATENT DOCUMENTS

JP 58-203417 * 11/1983 ............. G02F/1/17

OTHER PUBLICATIONS

Ball, Philip, "Technology: Self Assembling Mirrors", *Nature Science Update*, Thursday Jul. 29, 1999; © Macmillan Magazines Ltd 1999—Nature News Service, Nature© Macmillan Publishers Ltd 1999 Reg. No. 785998 England; http:/www.nature.com/nsu/990729/990729–4.html (2 pages).

Zheng, Wen Yue, et al., "Phase Behavior of New Side Chain Smectic C* Liquid Crystalline Block Copolymers", *Macromolecules* 1998, 31, 711–721; 1998 American Chemical Society, Published on Web Jan. 22, 1998.

Urbas, Augustine, et al., "Tunable Block Copolymer/Homopolymer Photonic Crystals**", *Advanced Materials (Communications)* 2000, 12, No. 11; Wiley–VCH Verlag GmbH, D–69469 Weinheim, 2000.

Urbas, Augustine, et al., "One–Dimensionally Periodic Dielectric Reflectors from Self–Assembled Block Copolymer—Homopolymer Blends", *Macromolecules* 1999, 32, 4748–4750; 1999 American Chemical Society, Published on Web Jun. 19, 1999.

Osuji, C.O., et al., "Understanding and Controlling the Morphology of Styrene–Isoprene—Side–Group Liquid Crystalline Diblock Copolymers", *Polymer* 41 (2000) 8897–8907; 2000 Elsevier Science Ltd. PII: S0032–3861(00)00233–0.

* cited by examiner

*Primary Examiner*—Alexander Eisen  
(74) *Attorney, Agent, or Firm*—Fay, Sharpe, Fagan, Minnich & McKee, LLP

(57) ABSTRACT

A reflective display device includes a flexible pouch of ordered copolymer layers with a lamellar structure and a solvent, the flexible pouch having at least a first and second surface. A substrate is placed in operative contact with a first surface of the flexible pouch. Thereafter, one of a pressure or heat application mechanism is placed in operative connection with at least one of the first and second surfaces of the flexible pouch. A controller operatively associated with one of the pressure or heat application mechanisms, is used to selectively apply pressure and/or heat to the flexible pouch. The application of the heat or pressure at a specific location on the flexible pouch results in a change of reflectivity in the ordered copolymer layers, thereby altering the color at that location.

17 Claims, 5 Drawing Sheets

US 6,940,485 B2

FLEXIBLE MICRON-THIN DISPLAY DEVICE

BACKGROUND OF THE INVENTION

The present invention is directed to display devices, and more particularly to reflective display devices. However, it is to be appreciated the invention may have applications in other imaging related environments and designs as well.

Industry is competitively seeking improved designs for displaying information in the form of text and/or images. One type of display technology is known as transmissive or emission-based imaging which emits visible light viewed by a user. Common transmissive display technologies include cathode ray tubes (CRT), and liquid crystal displays (LCDs), among others. A drawback of this technology is that it requires a large amount of energy. For example, an issue with portable electronic devices, such as laptop computers, PDAs and electronic tablets, are limitations due to energy requirements for operation of the associated transmissive display. Thus, a major stumbling block to providing even smaller, more compact and efficient devices are the power requirements of the displays. This issue is, however, not limited to only portable battery powered products which are being minimized. Any product which is operated by a battery or even a power line connection to a utility, faces the high cost associated with operation of transmissive/emission type displays.

Therefore, it has been deemed desirable to develop a display technology which uses less energy than existing transmissive emission-based systems. One particular technology which is being investigated is the use of reflective imaging. This technology generates images without the drawbacks of transmissive/emission based displays such as high energy costs. One specific implementation is electronic paper, which uses, for example, gyricon balls. Such displays uses small, multi-colored spheres having permanent di-pole movement when an appropriate electrical charge is applied. Selective application of the electrical charge by use of an addressing system causes selected gyricon balls to rotate, thereby displaying a different color than unselected gyricon balls, resulting in the forming of reflective images.

The present application seeks an alternative reflective display technology which may be used to generate images, such as for computers, electronic paper, outdoor billboards, PDAs or other imaging devices.

SUMMARY OF THE INVENTION

A reflective display device includes a flexible pouch of ordered copolymer layers with a lamellar structure and a solvent, the flexible pouch having at least a first and second surface. A substrate is placed in operative contact with a first surface of the flexible pouch. Thereafter, one of an energy application mechanism is placed in operative connection with at least one of the first and second surfaces of the flexible pouch. A controller operatively associated with one of the energy heat application mechanism, is used to selectively apply energy to the flexible pouch. The application of the energy at a specific location on the flexible pouch results in a change of reflectivity in the ordered copolymer layers, thereby altering the color reflected at that location.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT

Figure 1:
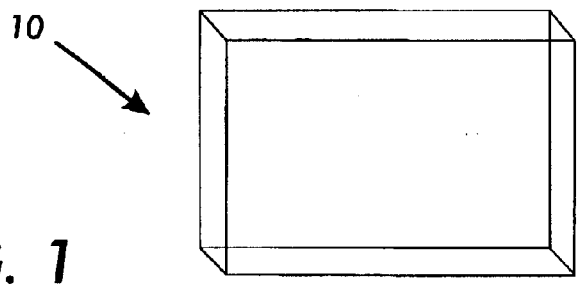
FIG. 1 is a copolymer block which may be used in connection with the present application.

FIG. 1 illustrates a copolymer block 10 is used in connection with an embodiment of the present application. In this embodiment the copolymer block 10 is a type of plastic known as a diblock copolymer, consisting of two different types of molecules chain-linked end to end. Generally, different types of plastics normally do not mix. However, in copolymers, the immiscible parts are joined together. To extricate itself from this unnatural position, the copolymers perform a self-assembling process by segregating their different parts (for example, a chain 1 and a chain 2, into microscopic domains. In one particular structure, molecules alternate the orientation of the chains, resulting in a sequence such as 1-2 . . . 2-1 . . . 1-2 . . . and so on. This assembly creates a series of layers of a first-type of chain alternating with layers of a second-type of chain. The thickness of the layers is generally determined by the lengths of the chains, resulting in a sandwiched structure with layers of equal thicknesses. To be appropriate for some optical implementations, the size of the respective domains may be increased. For example, by inserting an extra filling or layer of the second-type of chains between the two segments of the above-noted sequence (e.g., 1-2-2 . . . 2-2-1 . . . 1-2-2 . . . ).

In one instance, a mixture of polystyrene and a copolymer polystyrene-polyisoprene spontaneously form a layered stack. By providing the appropriate layering and thicknesses, the copolymer block 10 may be designed to operate at specified optical frequencies.

The above described copolymer is a diblock copolymer in a crystallized form. It is to be appreciated, however, the following described embodiments may also use a triblock copolymer. Another alternative approach is to utilize a liquid crystalline block whereby the domain thicknesses will vary linearly with block molecular weight. Still another design would be to blend the block copolymers with homopolymers in order to generate the needed domains. A number of papers have been written related to the various copolymers discussed above, for example "Tunable Block Copolymer/ Homopolymer Photonic Crystals", *Advanced Materials*, 2000, 12, No. 11, page 812; "One-Dimensionally Periodic Dielectric Reflectors From Self-Assembled Block Copolymer-Homopolymer Blends", *Macro Molecules*, 1999, 32, pages 47, 48–4750; "Understanding And Controlling The Morphology Of Styrene-Isoprene Side-Group Liquid Crystalline Diblock Copolymers", *Polymer*, 2000, 41, pages 8897–8907; and "Phase Behavior Of New Side Chain Smectic C* Liquid Crystalline Block Copolymers, *Macromolecules*, 1998, 31, pages 711–721. The teaching of these documents are hereby incorporated by reference.

Figure 2:
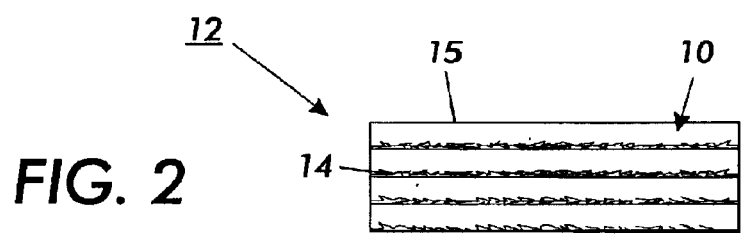
FIG. 2 depicts a flexible pouch incorporating the copolymer block and solvent.

Turning to FIG. 2, illustrated is a flexible pouch 12 design which includes copolymer block 10 of FIG. 1 and a solvent 14, wherein the solvent may be placed on top of and/or interspersed into the layers of copolymer block 10. The solvent is between 20–80% of the volume of the flexible pouch, and preferable approximately 30–50% of the volume. The flexible pouch 12 may be as small as 1 to 100 microns thick, and in some embodiments is preferably 2–10 microns. However, in other uses the thickness of the flexible pouch may be greater than 100 microns. In one embodiment the copolymer block 10 and solvent are encased within an appropriate substantially transparent material 15, which may be a plastic/polymer. In other embodiments the pouch 12 may be formed by the elements of the to-be-described reflective display devices.

Figure 3:
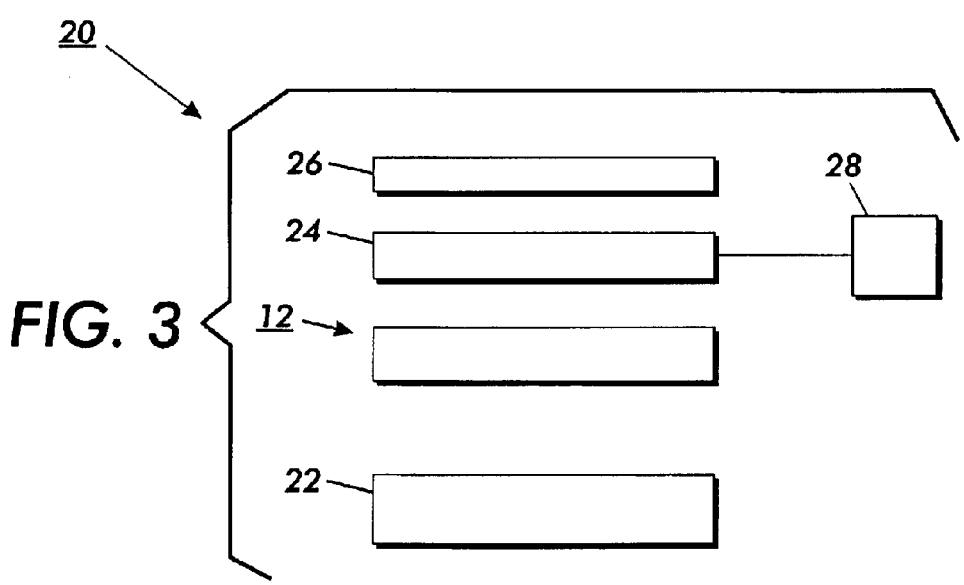
FIG. 3 is an exploded view of a first embodiment of a reflective display device wherein a pressure application mechanism is located on top of the copolymer block.

Turning to FIG. 3, illustrated is an exploded view of a reflective display device 20 according to one embodiment of the present application. A substrate 22 is formed as a base of reflective display device 20. Substrate 22 may be a flexible, semi-rigid or inflexible material such as silicon, hardened polymer, or other appropriate material. More particularly, an attribute of substrate 22 is that when pressure is applied to its surface, it will act as a substantially rigid surface. A second layer or element of display device 20 incorporates flexible pouch 12 such as described in FIG. 2, and a first surface of flexible pouch 12 is in physical contact with a first surface of substrate 22. A third layer or element of display device 20 is a pressure or energy application mechanism 24, and a surface of pressure application mechanism 24 is in contact with a second surface of flexible pouch 12. A substantially transparent coverplate 26 is located over or in contact with a second surface of the pressure application mechanism 24, to protect display device 20 from environmental elements. Transparent coverplate 26 may be a plastic, glass or other appropriate material. Additionally, in some embodiments coverplate 26 is optional.

Pressure application mechanism 24 is in operative connection with a controller 28 which controls operation of the pressure application mechanism 24. Controller 28 supplies signals to pressure application mechanism 24 whereby individual elements of the mechanism apply selective pressure to flexible pouch 12. Application of selective pressure to pouch 12 causes alteration of the reflectivity of the pouch whereby the visible light reflected by the pouch 12 is altered. More particularly, application of pressure by mechanism 24 results in small protuberances in the thin layers of the copolymer block 10 and movement of solvent 14, resulting in the light reflected from the pouch to be altered. In one embodiment, the layers in the copolymer block 10 may be on the submicron level wherein the application of the pressure alters the layer thickness sufficient to alter the light reflected therefrom.

A directly related or monatonic correlation exists between the amount of pressure applied and the color output obtained. By controlling pressure applied to the flexible pouch 12, it is possible to obtain an expected color at a specific location. Thus, by the selective application of pressure, an image may be generated.

In this embodiment, pressure application mechanism 24 is designed to be substantially transparent, such that in FIG. 3 a viewer looking down through the coverplate 26 will have an unobstructed view of an image which has been generated.

When pressure is applied by pressure application mechanism 24, substrate 22 provides a rigid surface allowing precise application of pressure.

Figure 4:
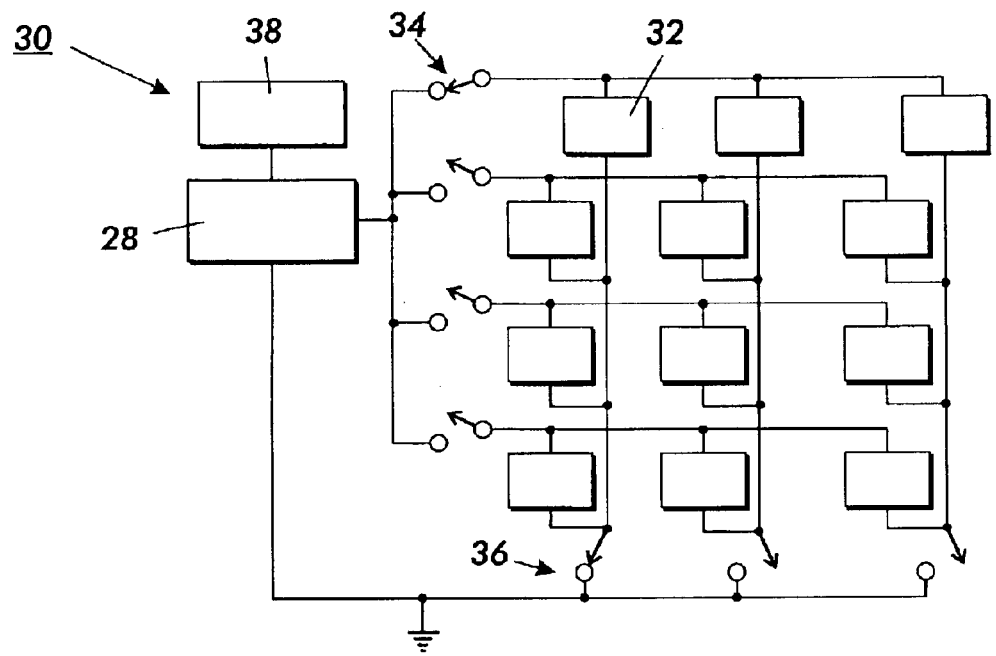
FIG. 4 illustrates one embodiment of a switching matrix which may be used as a pressure application mechanism.

A more detailed view of one embodiment of pressure application mechanism 24 is shown in FIG. 4, as a switching matrix 30 having a plurality of individual pressure applicators 32. In this design, the material and construction of switching matrix 30 is of any type and form capable of applying selective pressure to flexible pouch 12. For example, matrix 30 of FIG. 4 may be implemented as a page-wide series of micro-electromechanical (MEMS) devices, with piezoelectric characteristics, that are activated imagewise to apply pressure to flexible pouch 12. As also shown in FIG. 4, controller 28 selectively supplies activation signals, via row signal lines 34 and column signal lines 36 to specific pressure applicators 32. Controller 28 is powered by a power source 38, which includes a battery, solar cell, fuel cell, standard utility lines or other known power sources. Further, the signals supplied by controller 28, to signal lines 34, 36 are variable signals. Particularly, the pressure applicators 32 are designed to apply varying degrees of pressure dependent upon the signal provided. Thus, a plurality of colors may be obtained at a single pixel site, dependent on the amount of pressure applied to flexible pouch 12 by pressure applicators 32. This selective application of differing degrees of pressure to flexible pouch 12 permits the formation of viewable images.

It is to be noted that FIG. 4 is a general block diagram of matrix switching matrix 30, and other designs are equally applicable to the present embodiments. Also, switching matrix 30 is, designed in the first embodiment, to be substantially transparent. This may be achieved through the use of MEMS devices of sufficient thinness as to not block the wavelength of light being displayed. Additionally, appropriate materials may be used such as indium tin oxide or other material which results in the switching matrix 30 with a transparent characteristic.

Figure 5:
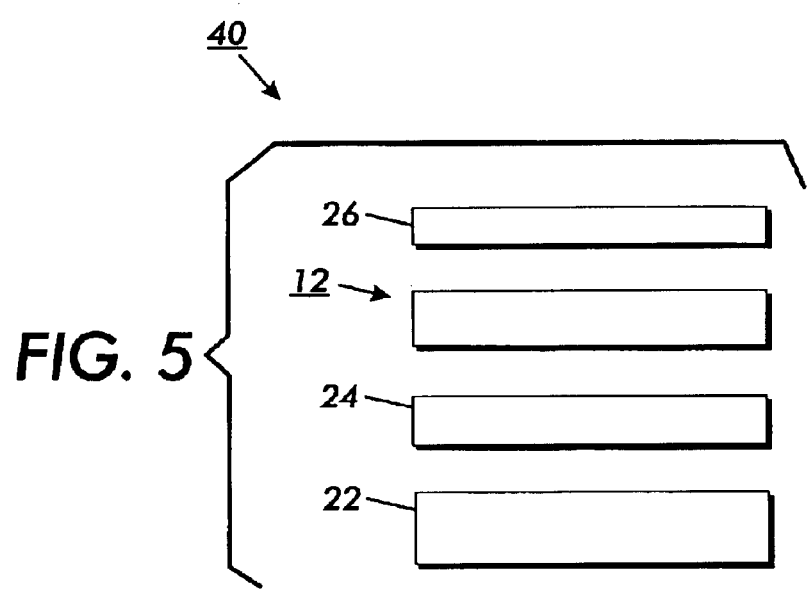
FIG. 5 illustrates an exploded view of a second embodiment for a reflective display device wherein the pressure application mechanism is located below the flexible pouch.

Turing to FIG. 5, illustrated is an exploded view of reflective display device 40 in accordance with a second embodiment of the present application. In this design, pressure application mechanism 24 is located below flexible pouch 12. Therefore, when pressure is applied by application mechanism 24, coverplate 26 acts as the rigid layer maintaining pouch 12 in a fixed position. In this design the pressure applied to the back side of pouch 12 is transferred through the pouch whereby a corresponding area on the other side of pouch 12 is pressed against the coverplate 26. This causes a reflectivity change at this location. The size of the location is dependent on the size of the pressure applicators 32, which in one embodiment may be sized to generate a change in the area equivalent to a standard sized pixel. It is to be appreciated the amount of pressure applied to obtain a specific reflective change, will in some implementations be different from the embodiments shown in FIG. 3, due to differences in the described physical designs. In this embodiment, the pressure application mechanism does not need to be transparent, and a user will view an image through plastic coverplate 26.

Figure 6:
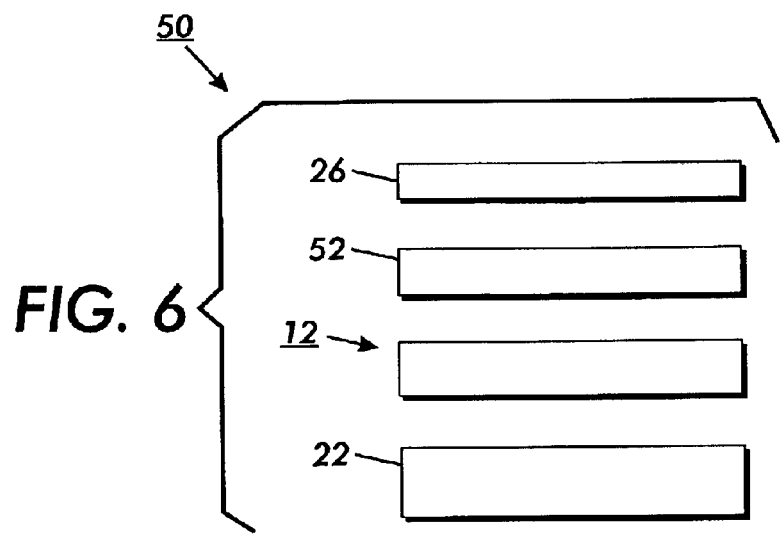
FIG. 6 is an exploded view of a third embodiment of a reflective display device wherein a heat application mechanism is located on a top surface of a flexible pouch.

Turning to FIG. 6, illustrated is an exploded view of another reflective display device 50 embodiment. In this configuration, the pressure application mechanism 24 is replaced with a heat or energy application mechanism 52. Again, and similar to the previous embodiment of FIG. 3, heat application mechanism 52 is placed on an upper surface of flexible pouch 12, which is in operative attachment to substrate 22. As previously disclosed, a concept of the present application is to change the thickness of the layers in copolymer block 10, in order to induce a color reflecting change. Previously disclosed in this application, the color change has been obtained via a mechanical operation wherein the changes in reflectivity is altered via application of mechanical pressure. Selective application of heat also generates protuberances in the thin layers thereby altering the reflectivity of the flexible pouch.

Figure 7:
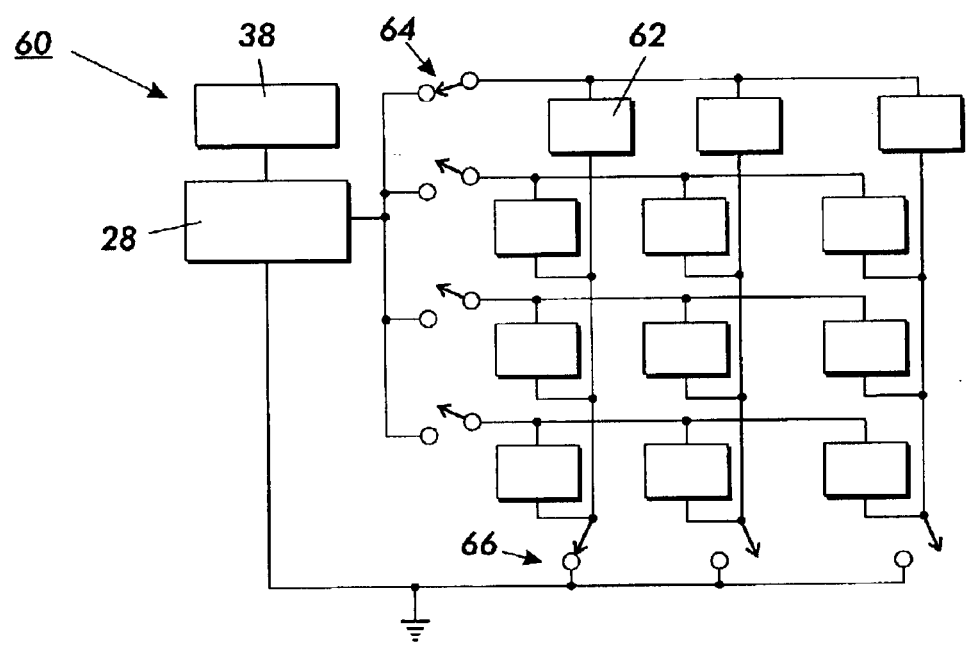
FIG. 7 is a switching matrix which may be used as a heat application mechanism.

As shown in FIG. 7, a heating matrix 60 which may be used as heat application mechanism 52 is shown, including heat application members 62. These heat application members are sized sufficient for altering selected size changes of the flexible pouch 12. In this embodiment, the heat application members 62 may be made of a number of different materials, including but not limited to heater coils or plates which are supplied with energy by a controller 28, via row signal lines 64 and column signal lines 66. As shown in FIG. 7, controller 28 may be supplied with power via power source 38. Controller 28 includes the logic for obtaining the proper switching sequences and determines the amount of heat to be generated by heat application members 62.

Figure 8:
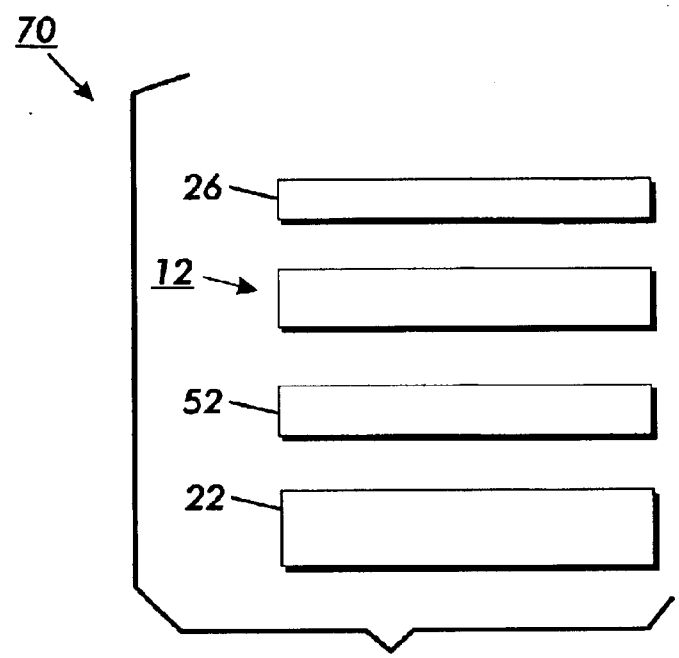
FIG. 8 is an exploded view of a fourth embodiment of a reflective display device wherein a heat application mechanism is located on a lower surface of the flexible pouch.

Turning to the exploded view of FIG. 8, a further embodiment of a display device 70 employing the concepts of the present application is illustrated. In this embodiment, the heat application mechanism 52, similar to the pressure application mechanism 24 of FIG. 3, is placed underneath the flexible pouch 12. In a similar manner, the matrix such as shown in FIG. 7 supplies selective areas of the flexible pouch with heat causing protuberances that alter the reflectivity of the flexible pouch, allowing generation of an image.

It is to be appreciated, while mechanical energy and heat energy have been disclosed as techniques to selectively alter the thicknesses of the copolymer blocks, other techniques may also be used. For example, another technology to change the thickness of the layers of the copolymer block is acoustic energy in the form of acoustic waves. The application of acoustic waves may be achieved in a number of ways, including generating the waves from emitters arranged in a matrix design. A transducer may be used to emit an acoustic wave, which in turn is focused by a lens or other focussing element. Examples of such acoustic wave emitters are found in connection with acoustic ink printing technology.

As previously addressed, one aspect of the present application is forming the flexible pouch 12 to include a solvent 14. Flexible pouch 12 is in some embodiments designed to include submicron thin film layers of the copolymers, with the solvent incorporated therein. The use of the solvent 14 permits the changing of the layer thicknesses when pressure and/or heat or other process is used.

An issue to be addressed therefore, is the movement of the solvent 14 when energy is applied to pouch 12. Specifically, as pressure is applied at a location on the pouch 12, the solvent is forced away from this location, including the solvent between the layers. The movement of solvent encourages the layer compression, which results in a change in color reflection.

Figure 9:
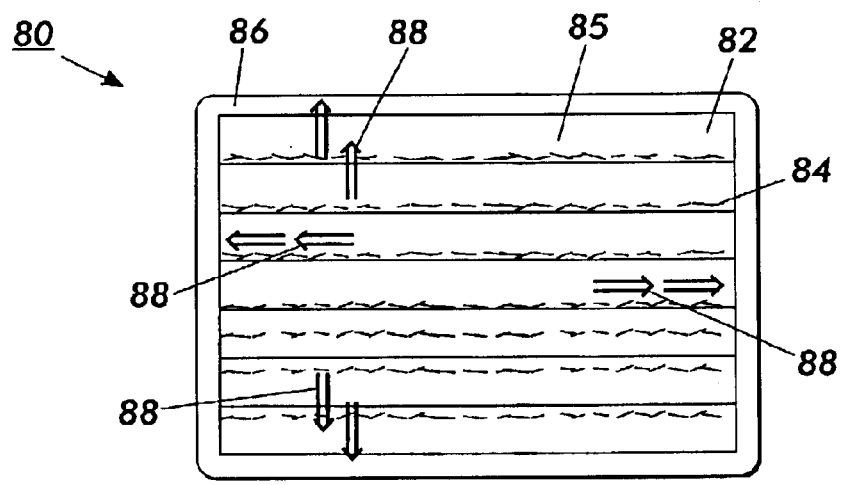
FIG. 9 describes an embodiment of the flexible pouch including a reservoir area, wherein the flexible pouch of FIG. 9 may be used in all the embodiments of the present application.

With attention to FIG. 9, illustrated is an embodiment of a flexible pouch 80, again having copolymer layers 82 and solvent 84 in a copolymer/solvent area 85. In addition, a reservoir 86 is provided. The reservoir is designed such that when mechanical, heat, acoustic or other types of energy are applied to the copolymer solvent area, the solvent moves into the reservoir 86, as shown, for example, by lines 88. Particularly, as the flexible pouch 80 has energy applied at a location causing pouch 12 to pinch or squeeze, the compression causes solvent to flow into neighboring areas, and causes solvent in those areas to eventually be forced into the reservoir 86.

Again the solvent of flexible pouch 80 allows for compression of the polymer layers locally, since the compressed solvent flows into the neighboring areas without disrupting the copolymer domains. The specific solvent is dependent on the type or composition of the block copolymers used. Both organic and inorganic solvents may be used, including but not limited to toluene.

Further, while in one embodiment we have noted the ordered/lamellar block copolymer may be a styrene/butadiene combination, it is to be appreciated, dependent upon the particular elements and refractive reaction desired, other copolymer blocks may be employed.

Figure 10:
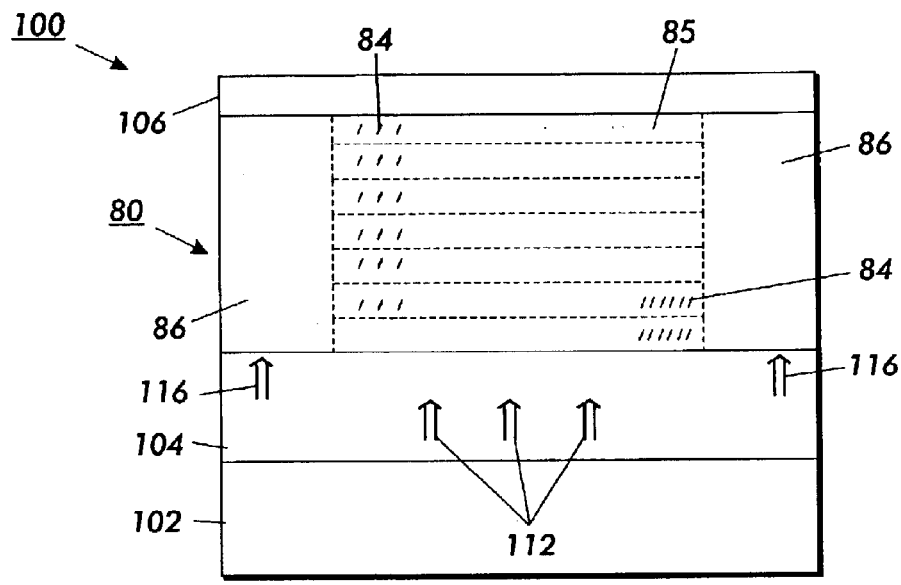
FIG. 10 depicts a further embodiment of a display device incorporating the disclosed reservoir.

Turning to FIG. 10, illustrated is a display device 100 according to an embodiment of the concepts of the present application. Shown as a side view, a substrate layer 102 is in operative connection with application mechanism 104. The application mechanism 104 may be a mechanical application mechanism, heat application mechanism, acoustic mechanism or other manner of applying pressure to flexible pouch 80. Also shown is coverplate 106 on top of flexible pouch 80.

This design is similar to previous embodiments. However, in addition to flexible pouch 80 having copolymer/solvent section 85, also included is reservoir 86. As points of pressure, as indicated by arrows 112, are applied to flexible pouch 80, solvent 84 moves into the reservoir section 86. In one embodiment, the interconnection between the copolymer/solvent section 85 and reservoir 86 is simply an open passageway whereby as pressure is applied, the solvent 84 moves into reservoir 86. As the pressure is removed, the solvent 84 moves back into the copolymer/solvent section 85. In one embodiment, this may be accomplished by locating the reservoirs at a height somewhat higher than the copolymer/solvent section 85. Due to the thinness of the layers and compression of the device, the effects of gravity may be slowed and therefore will not interfere with the operation. Therefore, the structure may work even if the display device 100 is in the vertical plane. In one embodiment, pressure application mechanism 104 does not need to extend out past the copolymer/solvent section 85, but rather it is sufficient to have the application mechanism extend only to the end of copolymer/solvent section 85, and allow gravity to operate to return the solvent to copolymer/solvent section 85.

However, in the embodiment of FIG. 10, it is noted the application mechanism 104 is shown to extend the full length of the flexible pouch 80. In this design, as pressure is applied to the copolymer/solvent section 85, the solvent 84 again moves into the reservoir section 86. But as also depicted in FIG. 10, when the pressure points 112 are removed and new pressure points 116 are activated via controller 28 (not shown), the pressure acts to force movement of the solvent 84 back into the copolymer/solvent section 85.

Figure 11:
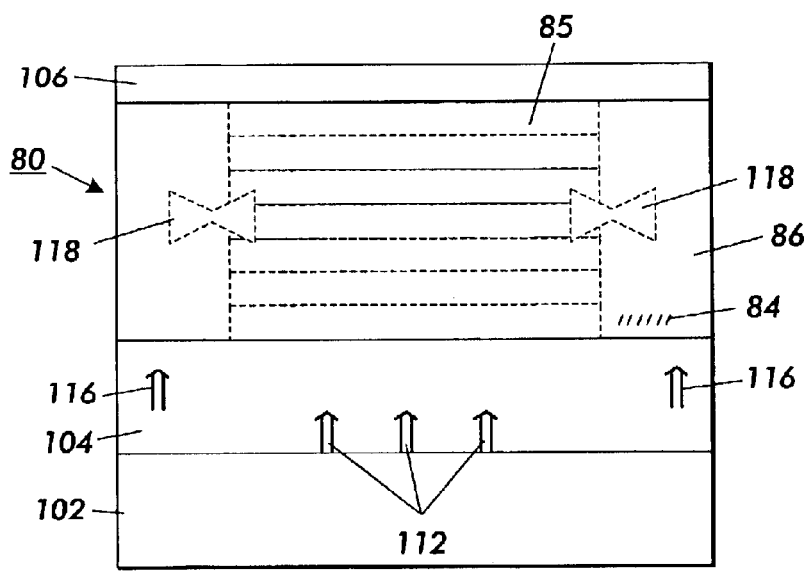
FIG. 11 sets forth yet a further embodiment of the reflective display device, including the flexible pouch incorporating valving mechanisms for control of movement of solvent within the flexible pouch.

Turning to FIG. 11, depicted is an embodiment including a filter or valving arrangement 118. In this design, a two-way valve is provided wherein a predetermined amount of pressure is needed to move the solvent from one section to another. Thus, when pressure points 112 are activated, the valve is forced open allowing fluid to flow into reservoir 86. Once the pressure is removed, however, the valve closes and fluid may not move back. Thereafter, when the pressure points 116 are activated, valve 118 opens in the opposite direction and the solvent 84 reenters the polymer/solvent area 85. Although the embodiments of FIGS. 10 and 11 show application mechanism 104 below pouch 80, it is to be understood these concepts are also applicable to embodiments where the application mechanism is on an upper surface of the pouch.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A reflective display comprising:
   a flexible pouch of ordered copolymer layers with a lamellar structure and a solvent, the flexible pouch having at least a first and second surface;
   a substrate in operative contact with the first surface of the flexible pouch;
   an energy application mechanism in operative connection with at least one of the first and second surfaces of the flexible pouch;
   a controller operatively associated with the energy application mechanism, to selectively apply energy to the flexible pouch, wherein at the location of the flexible pouch has energy applied thereto, a change in reflectivity of the ordered copolymer layers with the lamellar structure occurs.

2. The reflective display according to claim 1, wherein the flexible pouch is one of a diblock or triblock copolymer.

3. The reflective display according to claim 1, wherein the solvent is an organic solvent.

4. The reflective display device according to claim 1, wherein the flexible pouch includes a reservoir, the reservoir being designed to receive some of the solvent when the energy application mechanism applies energy at an area of the flexible pouch.

5. The reflective display device according to claim 1, wherein the energy application mechanism is a matrix of individually controllable energy applicators.

6. The reflective display device of claim 5, wherein the controllable energy applicators are pixel-sized electrodes.

7. The reflective display device of claim 1, wherein the energy application mechanism is substantially transparent.

8. The reflective display device of claim 1, further including a transparent cover in operative attachment to at least one of the flexible pouch or the energy application mechanism.

9. The reflective display device of claim 2, wherein the energy application mechanism is a pagewide series of MEMS devices activated imagewise to apply selected pressure.

10. The reflective display device of claim 1, wherein the energy is piezochromic, caused by use of a piezoelectric device.

11. The reflective display device of claim 1, wherein the diblock copolymer layers are styrene/butadiene.

12. The reflective display device of claim 1, wherein the change in reflectivity is controllable based on an amount of applied energy.

13. The reflective display device of claim 1, wherein the solvent is approximately 30–50% of the volume of the flexible pouch.

14. The reflective display device of claim 1, wherein the flexible pouch is 1 to 100 microns thick.

15. The reflective display device of claim 1, wherein the copolymer layers are submicron thick.

16. The reflective display device of claim 1 wherein the energy application mechanism applies at least one of mechanical pressure, heat or acoustic waves.

17. The reflective display according to claim 1 wherein there is a monatonic relationship between the energy applied by the energy application mechanism and the change in reflectivity of the flexible pouch.

* * * * *